United States Patent [19]
Albee, Jr.

[11] Patent Number: 4,502,654
[45] Date of Patent: Mar. 5, 1985

[54] TRIPOD STAND

[75] Inventor: Percy F. Albee, Jr., Bristol, R.I.
[73] Assignee: Q-Panel Corporation, Providence, R.I.
[21] Appl. No.: 476,836
[22] Filed: Mar. 18, 1983
[51] Int. Cl.³ .............................................. F16M 11/38
[52] U.S. Cl. ..................................... 248/168; 248/188
[58] Field of Search ............... 248/168, 169, 170, 173, 248/440, 463, 464, 465, 96, 188; 403/171, 172

[56] References Cited
U.S. PATENT DOCUMENTS

| | | | |
|---|---|---|---|
| 2,588,399 | 3/1952 | McQuin | 248/170 |
| 2,794,688 | 6/1957 | Scott | 248/168 |
| 3,119,356 | 1/1964 | Sauer | 248/440 |
| 3,210,034 | 10/1965 | Bonanno | 248/168 |
| 3,716,211 | 2/1973 | Butz | 248/168 |

Primary Examiner—William H. Schultz
Assistant Examiner—Ramon O. Ramirez
Attorney, Agent, or Firm—Barlow & Barlow Ltd.

[57] ABSTRACT

A collapsible tripod stand for an easel is disclosed which has three legs of channel cross section with one end of each of the legs having outwardly extending wing portions which are loosely fastened to each other by fastening means, the wing portions being bent at an angle so that when the legs assume a pyramidal form, the wing portions will assume face-to-face contact. Compression spring means between the ends of the fasteners and the face of the wings urge the legs to assume pyramidal form.

5 Claims, 8 Drawing Figures

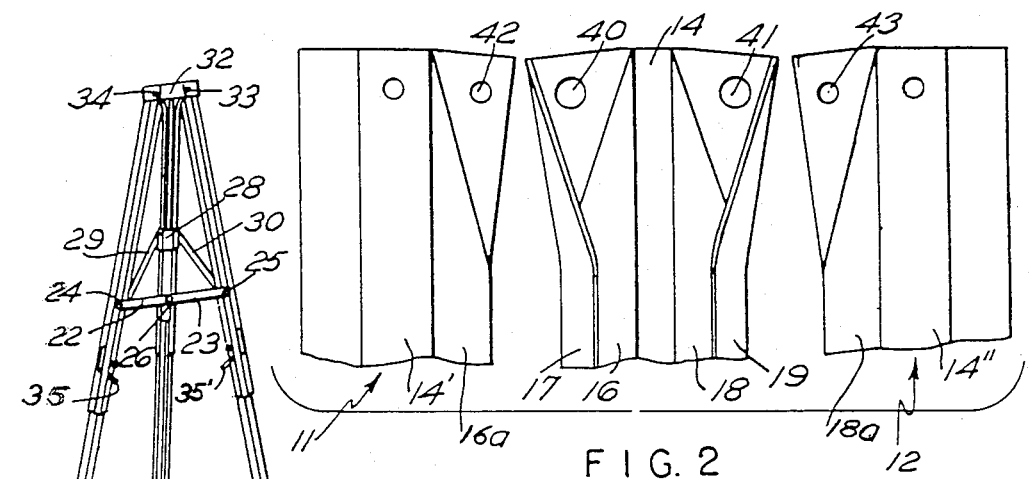
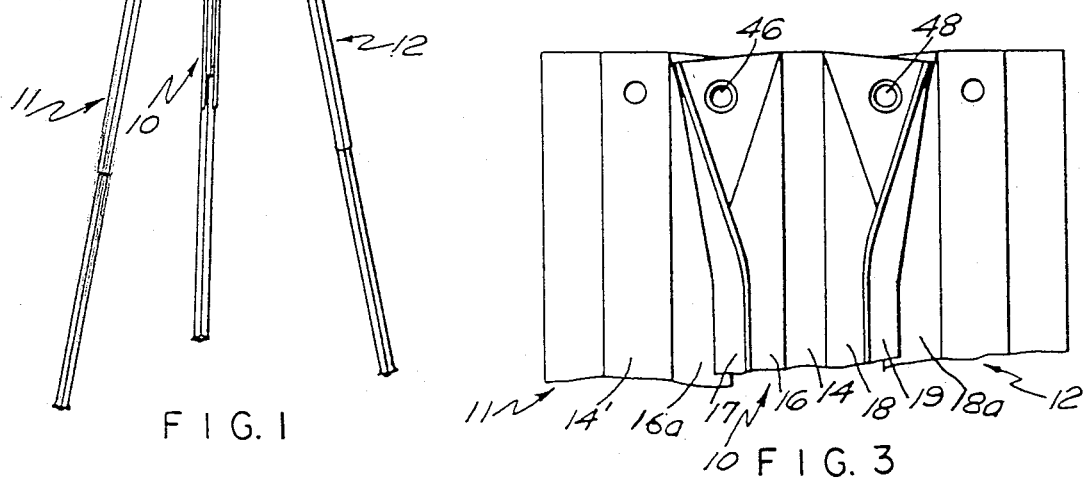
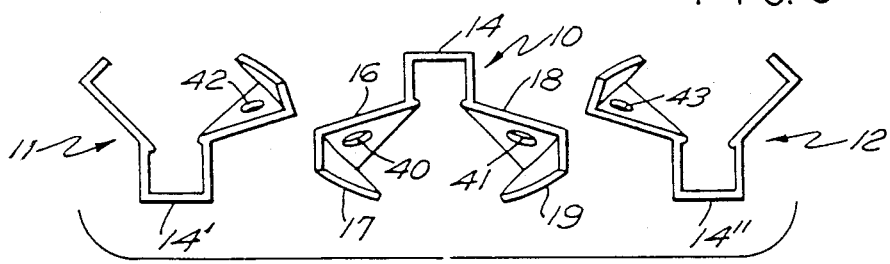
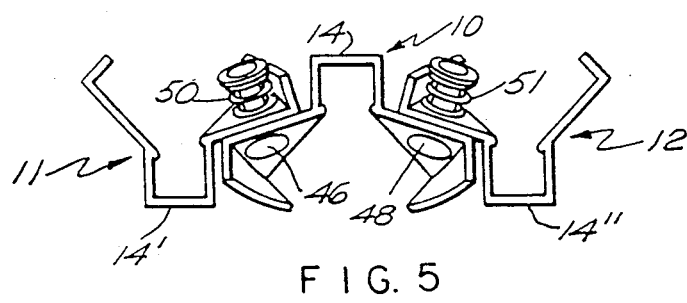
FIG. 1
FIG. 2
FIG. 3
FIG. 4
FIG. 5

TRIPOD STAND

BACKGROUND OF THE INVENTION

This invention relates primarily to tripod stands for easels that may be used by artists and/or other uses, as for example in sales presentations, and in the past have been designed in arrangements where a head portion is provided at which point the legs of the easel may pivot outwardly into pyramidal form. An easel stand of this form is illustrated in U.S. Pat. No. 2,550,550. In many cases the head is arranged in such a way that two legs pivot on a parallel axis while the third leg pivots on an axis at right angles to the first two. In this fashion at least two legs assume a planar relationship so that easel boards and the like may be easily accommodated on the face of the two legs. Many of the prior art units are complicated to manufacture and assemble.

SUMMARY OF THE INVENTION

The present collapsible tripod easel stand solves many of the problems of the past since it is made of three identical legs of channel-shape cross section which are secured to each other by outwardly extending wing portions and fastening means of such a length as to permit the legs to be opened out into pyramidal arrangement, the legs otherwise being adapted to lie in parallel order with the center leg lying inside the two outer legs. The legs are also provided with suitable brace sections that extend therebetween to rigify the pyramidal form of the tripod easel stand. By providing enlarged openings in the wing portions of at least the outer legs and by providing a compression spring in the fasteners that urge the wing portions together, the tripod stand may readily open into pyramidal form as the center leg is urged outwardly from the other two outer legs.

DESCRIPTION OF THE DRAWINGS

FIG. 1 is a perspective view of the tripod stand made in accordance with the invention showing the stand in its open position;

FIG. 2 is a detached partial plan view showing the upper portion of the legs and their respective wing portions, with the legs being detached from each other;

FIG. 3 is a view similar to FIG. 2 with the legs attached;

FIG. 4 is a detached end view taken from the upper end of the legs;

FIG. 5 is an end view taken from the top of the legs with the same assembled;

DESCRIPTION OF THE PREFERRED EMBODIMENT

Figure 6:
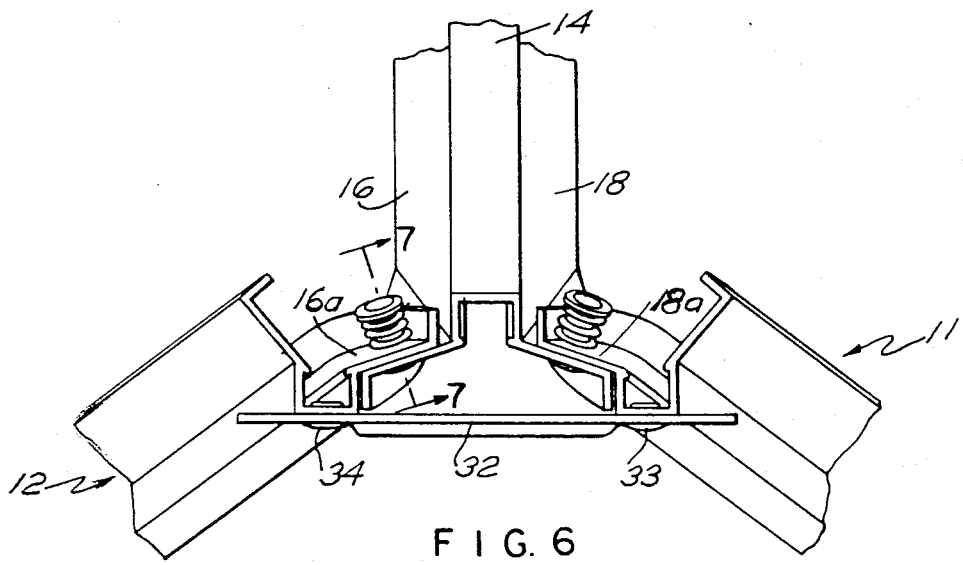
FIG. 6 is an elevational view of the top portion of the tripod stand showing the legs in opened position.
Figure 7:
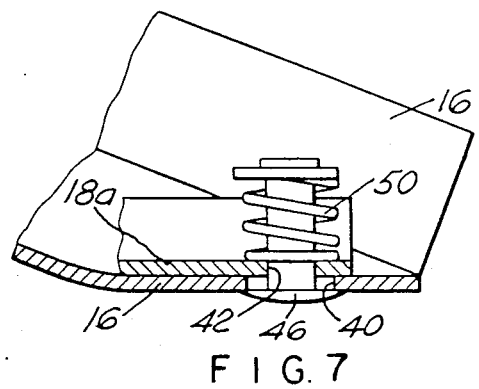
FIG. 7 is a sectional view taken on lines 7—7 of FIG. 6.

The tripod stand that is illustrated in FIG. 1 has three legs such as the center leg generally designated 10, and the two outer legs generally designated 11 and 12. As seen more particularly in FIG. 4, each of the legs is of a special channel-shaped cross section that consists essentially of a central U-shaped portion 14 and wing portions 16 and 18 which have inwardly turned edges respectively 17 and 19 (FIG. 2 and 4). Within this particular channel shape additional telescopic portions may be received (see FIG. 1) so that the tripod stand may be extended and locked into position by devices which form no part of the instant invention, but which are known to those skilled in the art.

Between the two outer legs 11 and 12, are a pair of brace sections 22 and 23, the brace section 22 being pivoted to the leg 11 as at 24, while the section 23 is pivoted to the leg 12 as at 25 and the two brace sections are pivoted together as at 26. Additionally, a sleeve 28 at least partially embraces the center leg 10 and has pivoted thereto a pair of brackets 29 and 30 which are respectively pivoted to the legs 11 and 12. The arrangement is such that, when in folded condition, the brace sections 22 and 23 will scissor together while the sleeve 28 will slide upwardly as the center leg is brought inwardly toward the two outer legs. To establish rigidity of the structure, a head plate 32 is fastened, as by fasteners 33 and 34, to the outer legs 11 and 12 so that together with the brace sections 22 and 23, a substantially planar arrangement is provided to support an easel which may be readily supported by easel support clips shown as at 35 and 35' (FIG. 1).

The connection between the center leg and the outer legs is formed by bending the wing portions of the leg sections at a particular angle. For example, by referring to FIGS. 2 through 5, there can be seen that the wing sections 16 and 18 of the center leg 10 are directed outwardly from the main channel portion 14 at a flatter angle than the basic shape of the channel configuration. Similarly, the wing portions of the outer legs 11 and 12, which are designated for convenience 16a and 18a respectively, are also bent at a flatter angle than the main portion of the leg. The amount of the bend that is imparted to these wing portions is such that when the legs are in their fully opened position, as seen in FIG. 6 of the drawings, those particular bent wing portions will assume face-to-face contact.

To provide connection between the wing portions, openings are provided in the wing portions, there being a pair of openings in each of the wing portions of the leg 10 designated 40 and 41, while the leg 11 has an opening 42 in its wing portion and leg 12 has an opening 43 in its wing portion. This arrangement is such that a fastener, such as a rivet 46 may pass through the openings 40 and 42 while a fastener in the form of a rivet 48 passes through the openings 41 and 43. It will also be noted that the size of the mating openings through which the fasteners 46 and 48 pass vary. That is to say, one opening will be of a size to snuggly receive the rivet while the other opening through which the same rivet passes will be of a larger size. Further, it will be noted that the fastener, which is shown in the form of a two-headed rivet, has an elongated dimension with a head removed from the face of at least one of the wings so that a compression spring, such as a compression spring 50 and 51, are received respectively on the fasteners 46 and 48. The result of this arrangement is that the compression spring will normally urge the two wing sections to engage in face-to-face planar contact, which is amply illustrated in FIG. 6.

Figure 8:
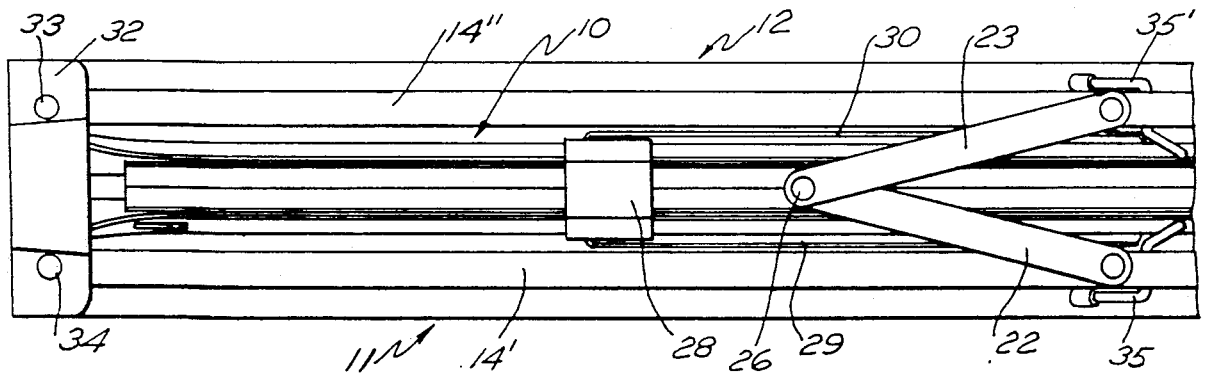
FIG. 8 is a plan view showing the tripod stand in collapsed, folded condition.

By referring to FIG. 8, it can be seen that when it is desired to collapse the easel, the center leg is moved inwardly toward the two outer legs, which forces the sleeve 28 upwardly and causes a scissor arrangement between the two brace sections 22 and 23; and in effect, the center leg nests between the two outer legs with the wing sections 16 overlying the wing section 18a, while the wing section 16a will overly the wing section 18, thus providing a very compact structure which can lie flat and fit into carrying case pouches which are commonly provided with easels.

I claim:

1. A collapsible tripod stand for an easel comprising a pair of outer legs and a center leg of channel cross section, one end of each leg having at least an outwardly extending wing portion, said legs normally lying in alternate facing relationship whereby the wing portions of the outer legs overly the wing portions of the center leg, an opening in each wing portion that faces an adjacent wing portion of another leg, a fastener secured in the openings of the center leg and passing loosely through an opening of each outer leg whereby the outer legs may be moved relative to the center leg to a generally pyramidal form.

2. A collapsible tripod stand as in claim 1 wherein centrally pivoted brace sections extend between the outer legs.

3. A collapsible tripod stand as in claim 1 wherein a sleeve embraces the center leg and brackets pivot the outer legs and on the sleeve.

4. A collapsible tripod stand as in claim 1 wherein said wing portions are bent at an angle to assume face-to-face contact when the legs are open to pyramidal form.

5. A collapsible tripod stand as in claim 4 wherein the fasteners are elongated and a compression spring extends from one head of each fastener to the face of a wing to urge the legs to assume pyramidal form.

* * * * *